United States Patent [19]

Lyons

[11] 3,897,388

[45] July 29, 1975

[54] ANTIOXIDANT COMPRISING A HYDROXY AROMATIC COMPOUND CONTAINING SULFUR AND ORGANIC PHOSPHITE

[75] Inventor: Bernard J. Lyons, Palo Alto, Calif.

[73] Assignee: Raychem Corporation, Menlo Park, Calif.

[22] Filed: Oct. 11, 1973

[21] Appl. No.: 405,553

[52] U.S. Cl. .... 260/45.8 R; 260/45.7 P; 260/45.7 S
[51] Int. Cl. ............................................. C08f 45/58
[58] Field of Search ............................... 260/45.8 R

[56] References Cited
UNITED STATES PATENTS

| | | | |
|---|---|---|---|
| 3,039,993 | 6/1962 | Friedman | 260/45.8 R |
| 3,255,191 | 6/1966 | Dexter et al. | 260/45.8 NT |
| 3,277,044 | 10/1966 | Weissermel et al. | 260/45.8 R |
| 3,310,609 | 3/1967 | Baranauckus et al. | 260/45.8 R |
| 3,354,117 | 11/1967 | Schmidt et al. | 260/45.95 C |
| 3,356,770 | 12/1967 | Larrison | 260/45.7 P |
| 3,440,212 | 4/1969 | Tholstrup | 260/45.8 R |
| 3,442,853 | 5/1969 | Gobstein | 260/45.8 R |

*Primary Examiner*—Melvyn I. Marquis
*Attorney, Agent, or Firm*—Lyon & Lyon

[57] ABSTRACT

An improved antioxidant composition, especially suitable for irradiated or fire-retardant plastics, comprising a mixture of a hydroxy aromatic compound containing sulfur and organic phosphite compounds.

6 Claims, No Drawings

ANTIOXIDANT COMPRISING A HYDROXY AROMATIC COMPOUND CONTAINING SULFUR AND ORGANIC PHOSPHITE

BACKGROUND OF THE INVENTION

This invention generally relates to antioxidant compositions, and more particularly, to compositions especially suited for use with irradiated polyolefins and highly filled plastics, such as fire-retardant plastics.

Olefin polymers are particularly subject to severe deterioration from the oxidative action of air at elevated temperatures. They are also vulnerable to degradation by the action of ionizing radiation when large amounts of such radiation are deposited onto the polymer, e.g., amounts of $5 \times 10^{10}$ ergs per gram and higher. Oxidative deterioration at elevated temperatures, i.e., temperatures above 50°C, is manifested by surface crazing, cracking, and ultimately complete embrittlement.

Since a large amount of antioxidants, in the order of greater than 5%, results in increased cost and a decrease in plastic strength, it is desirable to obtain an antioxidant system which will be effective at elevated temperatures over long periods of time in relatively low amounts.

A highly efficient antioxidant system is particularly desirable for irradiated plastics. Often, during irradiation, much of the antioxidant is consumed or rendered incapable of functioning as an antioxidant. It is therefore necessary that an antioxidant system be employed for plastics which are to be irradiated which will be effective and survive radiation when used in small quantities so as to prevent oxidation even after being subjected to irradiation.

Also, it is very desirable to have an antioxidant of high efficiency for highly filled plastics. High amounts of filler are often required in the formulation of fire retardant plastics. It is necessary to incorporate a large amount of filler into the plastic to provide fire retardant properties. This generally results in a more permeable plastic composition which will more readily undergo oxidative degradation. Additionally, a large quantity of filler results in a decrease in plastic strength, so it is advantageous to have an efficient antioxidant which is effective in small amounts in the order of less than 5 p.p.h.

While hydroxy aromatic compounds containing sulfur or phosphites by themselves have been used as antioxidants, the combination of the two in one antioxidant system has not been disclosed. I have found that by combining a phosphite compound with a hydroxy aromatic compound containing sulfur, a more efficient antioxidant system is obtained.

Thus, it is an object of this invention to provide an antioxidant composition suitable for use with various polymers sensitive to oxidation and which is more efficient at elevated temperatures than the antioxidants of the prior art.

It is a further object of this invention to provide an antioxidant composition which is especially suitable for use with irradiated polyolefins.

It is another object of this invention to provide a antioxidant composition particularly suited for use in fire-retardant plastic systems which have a large percentage of filler.

SUMMARY OF THE INVENTION

An antioxidant composition, especially suited for irradiated or fire-retardant plastics, comprising a hydroxy aromatic compound containing sulfur and an organic phosphite compound. The hydroxy aromatic compound generally comprises phenol, cresol and naphthol groups with the sulfur preferably attached to at least one cyclic unsaturated compound. The cyclic unsaturated compound may be a homoaromatic or a heteronuclear unsaturated ring compound such as a triazine ring wherein a ring carbon atom is attached to the sulfur.

The organic phosphite contemplated for use in this invention is one having the general formula $[ROP(OR')]_nP_x$, wherein R is selected from the group consisting of an aliphatic, substituted aliphatic, aromatic and substituted aromatic group and R' is selected from the group consisting of hydrogen, an aliphatic substituted aliphatic, aromatic and substituted aromatic group wherein $n$ is an integer from 1 to 3 and $x$ is 0 or 1. Preferably at least one OR or OR' is a pentaerythritol derivative.

PREFERRED EMBODIMENT

Various thermoplastic materials were blended with from 1 to 6% hydroxy aromatic compounds containing sulfur and/or organic phosphite compounds. It was discovered that a blend of hydroxy aromatic compounds containing sulfur and organic phosphites, exhibited better antioxidant properties than either one when used alone at the same total additive level.

The antioxidant composition is particularly suitable for use with thermoplastic olefin polymers such as polyethylene, polypropylene, ethylene-vinylacetate copolymer, ethylene-acrylic ester copolymers, ethylene-propylene copolymer, ethylene-propylene-diene terpolymer. The antioxidant composition of this invention may also be suited for use with other polymers including polyvinylchloride, polyvinylidenechloride, and polyvinylidene fluoride and chlorinated polyethylene, acrylics, saturated and unsaturated olefin elastomers, polyethers and polyesters which are sensitive to oxidation.

Certain antioxidant compositions of this invention are particularly useful in plastics which are to be irradiated. The antioxidant composition of this invention has also been found well suited for use in highly filled fire-retardant plastic compositions.

Other phosphorus containing antioxidants useful in polymer systems are found in my concurrently filed applications entitled "Antioxidant Comprising a Hydroxy Aromatic Compound Containing Sulfur and an Organic Phosphonate" Ser. No. 405,554 filed Oct. 11, 1973 and "An Irradiatable Polymer Composition with Improved Oxidation Resistance" Ser. No. 405,521 filed Oct. 11, 1973

EXAMPLE I

Various mixtures of antioxidants were blended with a high density polyethylene (Marlex 6003, Philips Petroleum Company, density 0.096, M. I. 0.2) on a mill at 160°C and hydraulically pressed into 6 in by 6 in by 0.020 in slabs at 170°C and cooled, then irradiated to a dose of 20 Mrads.

To evaluate antioxidant efficiency, ⅛ in strips, 6 inches long were hung in a hot air circulating oven at 175°C. After varying periods of time, samples were withdrawn from the oven, allowed to cool for at least 4 hours to room temperature and then elongated in an Instron Tensile Tester. The initial jaw separation was 1 inch with an elongation rate of 2 in/minute. Jaw separation at rupture of the sample was used to indicate ultimate elongation.

The number of days of heat aging which resulted in rupture of the sample at or below .50% elongation on the Instron was selected as the failure point.

Various amounts of distearylpentaerythritoldiphosphite were added to the Marlex 6003, together with other antioxidants the results of which are summarized in Table 1.

TABLE I

| Antioxidant Blend | A | A:B | A:C | A:D | A:E | A:F | A:G | A:H | A:I |
|---|---|---|---|---|---|---|---|---|---|
| Ratio in p.p.h. 0:3 Days of Heat Aging to failure | (3pph) 14 | ~8 | 13 | 12 | >13 | 7 | 11 | 6 | 11 |
| pph 1:2 Days of Heat Aging to failure | | 13 | 13 | 25 | >23 | 13 | 17 | 14 | 11 |
| pph 2:1 Days of Heat Aging to failure | | >13 | 13 | 24 | >23 | 15 | 15 | 17 | 12 |

A is distearyl-pentaerythritoldiphosphite
B is 2,2'-thiobis(4-methyl-6-t-butyl-phenol)
C is tetrakis[3-(3,5-di-t-butyl-4-hydroxy phenyl) propionyloxymethyl] methane
D is 4,4'-thiobis(6-t-butyl-m-cresol)
E is oligomers of 4,4'-thiobis(6-t-butyl-m-cresol) as described in copending application Ser. No. 481,740, "Compositions of Antioxidants of Reduced Volatility".
F is a high molecular weight sulfur containing hindered phenol cyanurate (triazine derivative)
G is 4,4'-thiobis(6-t-butyl-o-cresol)
H is 1,1'-thiobis(2-naphthol)
I is bis[(3,5-di-t-butyl-4-hydroxyphenyl) propionyl-2-oxyethyl] sulfide As can be seen from Table 1, the phosphite alone (antioxidant A) or the hydroxy aromatic compound containing sulfur alone generally failed in less than 13 days at the 3pph level. However, a 3 pph level of a blend of phosphites and hydroxy aromatic compound containing sulfur gave substantially better results in the order of 25 days, indicating a synergistic result from the blending of the two ingredients. Also, where a nonsulfur containing phenol (antioxidant C) and a phenol with the sulfur atom not attached to an aromatic group (antioxidant I) were evaluated, little or no increased life was obtained. Thus, it appears that the preferred system is a phosphite with a hydroxy aromatic compound containing sulfur which has at least one of the sulfur atoms attached to an unsaturated cyclic compound.

EXAMPLE II

A fire retardant plastic of the following formula was used to evaluate antioxidant efficiency.

| | |
|---|---|
| Low density polyethylene | 40% |
| Ethylene-ethyl acrylate copolymer | 7% |
| Ethylene-propylene-diene terpolymer | 8% |
| Flame retardant (brominated aromatic) | 21% |
| Antimony oxide | 10% |
| Thermal Stabilizers | 6% |
| Trimethylolpropane trimethylacrylate | 3% |
| Antioxidant Combination | 5% |

Organic phosphites distearyl-pentaerythritoldiphosphite and Weston 243-B-phosphite

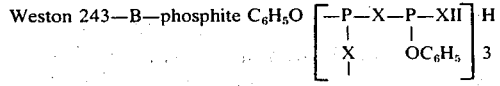

Where X is

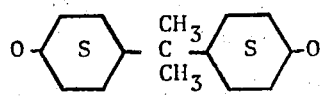

were blended with hydroxy aromatic compounds containing sulfur and tested for resistance to oxidation, the results of which are summarized on Table II.

TABLE II

| Antioxidant Blend | | J:E | J:K | A:E | A:K |
|---|---|---|---|---|---|
| Ratio in p.p.h. Days at 175°C for failure | 6:0 | less than 14 days | less than 14 days | less than 14 days | less than 14 days |
| Ratio Days at 175°C for failure | 4:2 | greater than 25 days | greater than 25 days | 26 days | 24 days |
| Ratio Days at 175°C for failure | 3:3 | 23 days | greater than 25 days | | |

TABLE II — Continued

| Antioxidant Blend | J:E | J:K | A:E | A:K |
|---|---|---|---|---|
| Ratio | 2:4 | | | |
| Days at 175°C for failure | 24 days | greater than 25 days | 23 days | 23 days |
| Ratio | 0:6 | | | |
| Days at 175°C for failure | 12 days | less than 16 days | 12 days | less than 16 days |

*A to I are the materials given in Table I.
J is

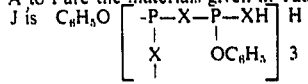

wherein X is

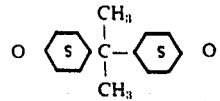

K is the reaction product of 3 moles of 4,4'-thiobis(6-t-butyl-m-cresol) with 1.05 moles of phosphorus oxychloride as described in U.S. Pat. No. 3,354,117.

EXAMPLE III

A plastic composition of the following formula was used to evaluate antioxidant efficiency

| | |
|---|---|
| High density polyethylene | 63 |
| ethylene vinyl acetate copolymers | 14 |
| Fillers | 10 |
| TiO$_2$ | 2 |
| Radiation crosslinking promoters | 7 |
| Total antioxidants | 4 |

Various phosphites were blended with antioxidant E to a total level of 4% in the above formulation and tested for resistance to oxidation. The testing procedure was the same as that of Example I except that the test strips were heat aged at 200°C. 4% of antioxidant E alone under these conditions failed after 100 hours.

Also, other hydroxy aromatic compounds and phosphite compounds, although not contained in the specific examples, will be understood by one skilled in the art to be suitable for this invention. For instance, the compounds disclosed in my concurrently filed applications, "Antioxidant Comprising a Hydroxy Aromatic Compound Containing Sulfur and an Organic Phosphanate" Ser. No. 405,554, filed Oct. 11, 1973 and "An Irradiatable Polymer Composition with Improved Oxidation Resistance" Ser. No. 405,521 filed Oct. 11, 1973.

TABLE III

| Parts of E | A | L | M | N |
|---|---|---|---|---|
| 1 Hours at 200°C for failure | 115 | 95 | 110 | 100 |
| 2 Hours at 200°C for failure | 130 | 130 | 115 | 120 |
| 3 Hours at 200°C for failure | 135 | 135 | 115 | 130 |

L is Weston 465 and is a proprietary high molecular weight phosphite believed to be similar to J.
M is Weston 467 and is a proprietary high molecular weight phosphite believed to be similar to J.
N is Weston TP24 and has the structure

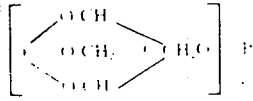

All these phosphites were supplied by Weston Chemical Company, a subsidiary of Borg Warner Corporation.

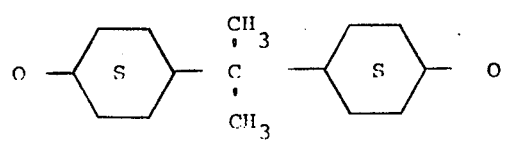

I claim:

1. An antioxidant composition suitable for use with polymers subject to oxidative degradation, especially irradiated and fire retardant plastics, comprising a mixture of hydroxy aromatic compounds containing sulfur selected from the group consisting of oligomers of 4,4'-thiobis (6-t-butyl-m-cresol) or the reaction product of phosphorus oxychloride and 4,4' thiobis (6-t-butyl-m-cresol) and an organic phosphite compound of the general formula $[ROP(OR')_2]_nP_x$, wherein R is selected from the group consisting of alkyl, substituted alkyl, aryl and substituted aryl and R' is selected from the group consisting of hydrogen, alkyl, substituted alkyl, aryl and substituted aryl wherein $n$ is an integer from 1 to 3 and $x$ is 0 or 1.

2. The composition of claim 1 wherein at least one OR or OR' is a derivative of pentaerythritol.

3. The composition of claim 1 wherein the organic phosphite is distearylpentaerylthitoldiphosphite.

4. The composition of claim 1 wherein the organic phosphite is diisodecyl pentaerythritol diphosphite.

5. The composition of claim 1 wherein the organic phosphite has the formula:

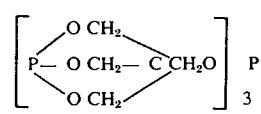

6. The composition of claim 1 wherein the organic phosphite is a polymeric phosphite of the general formula:

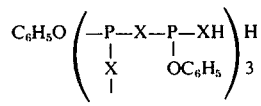

where X is